DIFFERENCE AMPLIFIER HAVING A REFERENCE VOLTAGE SOURCE

Filed Dec. 27, 1967

INVENTOR.
WILLEM EBBINGE
JOHANNES G.W. BOM
BY [signature]
AGENT

United States Patent Office 3,553,565
Patented Jan. 5, 1971

3,553,565

DIFFERENCE AMPLIFIER HAVING A REFERENCE VOLTAGE SOURCE

Willem Ebbinge and Johannes Gerardus Wouterus Bom, Emmasingel, Eindhoven, Netherlands, assignors, by mesne assignments, to U.S. Philips Corporation, New York, N.Y., a corporation of Delaware Filed Dec. 27, 1967, Ser. No. 693,824
Claims priority, application Netherlands, Jan. 5, 1967, 6700143
Int. Cl. H02j 7/14
U.S. Cl. 320—64 3 Claims

ABSTRACT OF THE DISCLOSURE

A regulating circuit for controlling the output voltage of a generator in accordance with the ambient temperature of a load. The negative temperature coefficient of the base-emitter threshold voltage is used as a voltage comparison standard in a difference amplifier controlling the flow of current to the field winding of the generator.

Figure 1:
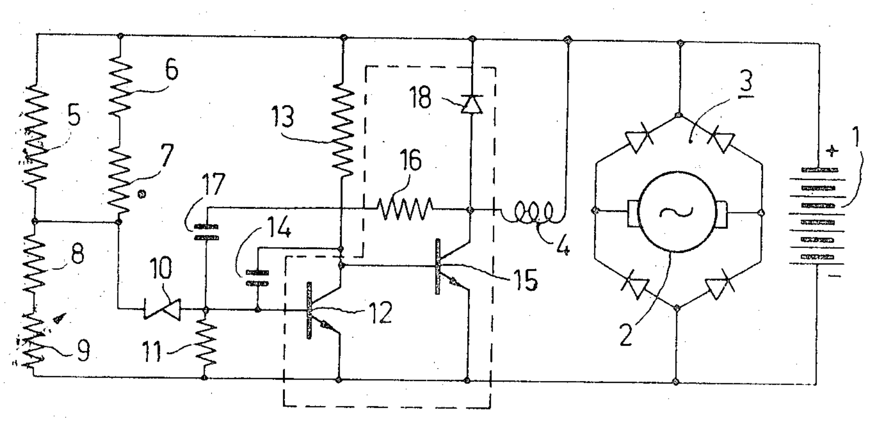

The invention relates to a difference amplifier, in which the voltage to be amplified is applied to the base-emitter path of a transistor of an amplifier stage by way of a voltage divider and the base-emitter-threshold voltage of this transistor is used as a reference voltage source having a negative temperature coefficient.

Such an amplifier is known. Difference amplifiers are used particularly in many control arrangements. Sometimes, for example, in accumulator charging arrangements, it is desirable that the reference voltage should increase with decreasing temperature. This can be achieved in a simple manner by means of a temperature-dependent resistor included in a voltage divider.

The invention has for an object to provide a simplified difference amplifier provided with a reference voltage source having a selected negative temperature coefficient, which moreover can be readily constructed as an integrated circuit or as a monolytic circuit arrangement.

The difference amplifier according to the invention is characterized in that the ratio of division of the voltage divider is chosen to be approximately equal to the ratio between the temperature coefficient of the base-emitter threshold voltage of the transistor and the desired temperature coefficient. However, this is possible only if the ratio between the base-emitter voltage required and the supply voltage is equal to the aforesaid ratio between the temperature coefficients. However, the fulfillment of this condition can usually be rendered possible by compensating the loss of sensitivity resulting from the ratio of division of this voltage divider by means of an additional amplifier stage.

The invention will be described more fully with reference to the drawing.

Figure 2:
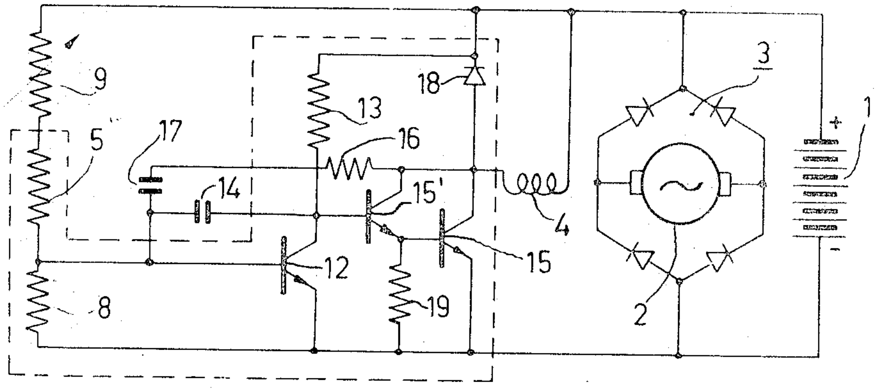

FIG. 1 shows the circuit diagram of an arrangement for charging an accumulator, in which a known difference amplifier controls the energization of a charging dynamo; and FIG. 2 shows the circuit diagram of the same arrangement which is provided with a difference amplifier in accordance with the invention.

The arrangement shown diagrammatically in FIG. 1 has a dynamo 2 with an output rectifier bridge 3 and an energizing winding 4. It serves to charge a storage battery 1, for example, a 12 v. battery of a motor vehicle. The current through the energizing winding 4 is supplied by the battery 1 and controlled by a difference amplifier in accordance with the comparison of the voltage across the battery 1 with a reference voltage.

Given experiences have shown that the voltage of a cell of a lead accumulator increases with temperature, the coefficient being approximately 0.006 v./° C. Consequently, if a 12 v. lead accumulator comprising six elements should be completely charged at a temperature of, for example, −20° C., it will have to be charged with a voltage of 6 $(2.4+40\cdot0.006)=15.84$ v. instead of $6\cdot2.4=14.4$ v.

The current through the energizing winding 4 should be controlled so that the charging dynamo 2, 4 no longer supplies any current through the rectifier to the battery 1 as soon as the terminal voltage of this battery has attained a charge value of approximately 14.4 v. at an ambient temperature of 20° C., which switching-off value should increase at −20° C. to 15.84 v. with a temperature coefficient of −0.036 v./° C. for the whole battery 1.

For this purpose, the arrangement includes a difference amplifier. Part of the voltage across the battery 1 is derived from the taping on an ohmic voltage divider comprising resistors 5, 6, 7, 8 and 9 and is applied, after subtraction of the substantially constant breakdown voltage across a Zener diode 10 serving as the reference voltage source, between the base and emitter of a transistor 12 of the npn-type of a first amplifier stage. The base-emitter path of transistor 12 is shunted by a resistor 11 through which the base of this transistor remains in connection with the emitter even upon extinction of the Zener diode 10. The collector is connected to the positive terminal of the battery 1 through a load resistor 13, to the base of a second transistor 15 of the npn-type and to a negative feedback capacitor 14 included between the collector and the base of transistor 12. The emitter of transistor 15 is connected, like the emitter of transistor 12, to the negative terminal of the battery 1, its collector being connected to the positive terminal of the battery through the energizing winding 4 and to the base of transistor 12 through a feedback circuit comprising the series-combination of a resistor 16 and a capacitor 17. As usual, the inductive load is constituted by the energizing winding 4 shunted by a damping diode 18.

The resistor 7 of the voltage divider is an NTC-resistor having a negative temperature coefficient and the values of resistors 5, 6, 8 and 9 are chosen so that at the switching-off value of, for example, 14.4 v. at 20° C. of the voltage across the battery 1, the voltage across resistors 8 and 9 is equal to the sum of the breakdown voltage across the Zener diode 10 and the base-emitter threshold voltage of transistor 12 and that this ratio is maintained at different temperatures, for example, at a switching-off value of 15.84 v. at −20° C.; the variable resistor 9 then permits of obtaining an accurate adjustment to the desired switching-off values.

With an increasing value of the charging voltage across the battery 1, first the Zener diode 10 breaks down and then the voltage drop across resistor 11 increases until it exceeds the base-emitter threshold voltage of transistor 12. This transistor then becomes conducting so that the transistor 15 is cut off. The feedback circuit 16, 17 promotes the switching process so that the switching losses in the transistor 15 remain low. The difference amplifier then operates as a monostable trigger arrangement, the switching-off periods determined by the elements 16 and 17 being substantially constant and the recurrence frequency of the switching-off periods increasing with the charging voltage across the battery 1, so that the charging voltage is limited by the periodic interruption of the current through the energizing winding 4.

The arrangement described above satisfies the requirements imposed, but it has a few disadvantages.

Firstly, the currents through the resistors 6 and 7 and through the resistor 11 are comparatively high and involve an additional dissipation, which not only results in an unnecessary loss, but also in the necessity of additionally cooling these resistors so that the behaviour of the arrangement at a varying ambient temperature will not be disturbed.

Secondly, the current through resistor 13 and the dissipation therein are unfavorably high during the switching-off periods. If the difference amplifier should be constructed at least in part as an integrated circuit or even as a monolytic circuit arrangement, only the part enclosed by a dotted line, i.e. transistors 12 and 15, resistor 16 and diode 18, suits this purpose.

It will be appreciated that the NTC-resistor 7 in the upper branch of the voltage divider 5–9 could be replaced by a PTC-resistor having a positive temperature coefficient in the lower branch of the voltage divider and that alternatively, the NTC- or PTC-resistor could be replaced by a reference voltage source having a suitable temperature coefficient.

The invention is based on recognition of the fact that the base-emitter threshold voltage of a transistor has a suitable temperature coefficient. In the embodiment of FIG. 2, the base-emitter threshold voltage of approximately 0.7 v. of transistor 12 is used as reference voltage source having a negative temperature coefficient of, for example, approximately —0.002 *v.*/° C. Thus, the NTC-resistor 7 with its series resistor 6, the Zener diode 10 and the shunt resistor 11 are dispensed with, whilst the adjustable resistor 9 is connected in the upper branch of the remaining voltage divider 5, 8, 9.

In order to obtain the desired temperature coefficient of, for example, approximately —0.036 v./° C., the ratio of division of the voltage divider 5, 8, 9 is chosen to be approximately equal to the ratio between the temperature coefficient of the base-emitter threshold voltage of the transistor 12 and the desired temperature coefficient of the switching-off voltage: for example, 0.002/0.036=1/18.

This results in a loss of sensitivity when compared with the arrangement of FIG. 1 in which the ratio of division may be, for example, of the order of 1/2. In the arrangement of FIG. 2, this loss of sensitivity is largely compensated for by an additional amplifier stage having a third transistor 15'. This transistor is connected as an emitter follower and its collector current also flows through the energizing winding 4, while a resistor 19 is connected between its emitter and the negative terminal of the battery 1 and guarantees a more satisfactory interruption of the current through this winding when the transistor 12 is conducting. When the transistor 12 is non-conducting, the battery needs supply through the resistor 13 only the comparatively small base current for the transistor 15' instead of the larger base current for the output transistor 15. Consequently, this resistor may have a higher value, which has a favourable influence on the sensitivity of the whole circuit arrangement, whilst the energy dissipated therein is considerably lower.

Due to the absence of the resistors 6, 7 and 11 and of the Zener diode 10 and to the reduction of the dissipation in the resistor 13, the whole difference amplifier, except the capacitors 14 and 17 and the variable resistor 9, may now be constructed as an integrated circuit or even as a monolytic circuit arrangement, which is particularly favourable in mass production.

In a practical experimental non-integrated embodiment of the difference amplifier of FIG. 2, the transistor 12 was of the type Philips BC108, the transistor 15' of the type Philips BFY51, the transistor 15 of the type Philips BDY10 and the diode 18 of the type Philips BYX20-200.

The resistors and capacitors had the following values:

Resistor 5: 1 kΩ
Resistor 8: 82Ω
Resistor 9: 0–1 kΩ
Resistor 13: 560Ω
Resistor 16: 120Ω
Resistor 19: 470Ω
Capacitor 14: 0.047μf.
Capacitor 17: 0.1μf.

The difference amplifier in accordance with the invention was used here in an arrangement for charging a storage battery, but it is also suitable for other uses, for example, for limiting the current through a winding, for example, of a transformer which on account of the more satisfactory cooling can pass a higher current at a low ambient temperature than at a higher ambient temperature.

What is claimed is:

1. A difference amplifier having a selectable temperature coefficient, comprising a transistor having base, emitter and collector terminals, the base and emitter terminals having a characteristic breakdown voltage therebetween varying in accordance with a negative temperature coefficient; a voltage divider comprising a first terminal, a second terminal, at least two series coupled resistors connected between the first and second terminals and a tap terminal connected to a junction of two adjacent resistors in the divider; means for connecting an input voltage to the first terminal of the divider; means for connecting the tap terminal of the divider to the base terminal of the transistor; and means for connecting the emitter terminal of the transistor and the second terminal of the divider to a reference voltage, whereby a portion of the input voltage is conducted to the base and emitter terminals of the transistor; the ratio of the resistance of the divider between the tap terminal and second terminal to the total divider resistance having a fixed value approximately equal to the ratio of the temperature coefficient of the base-emitter threshold voltage of the transistor to the selected temperature coefficient.

2. An amplifier as claimed in claim 1, used in an arrangement for charging an accumulator from a dynamo, wherein the amplifier controls the energization of the charging dynamo, wherein the amplifier includes an additional stage of amplification where the loss of sensitivity resulting from the ratio of division of the voltage divider is at least compensated for.

3. An amplifier as claimed in claim 2, wherein substantially the entire amplifier is an integrated circuit.

References Cited

UNITED STATES PATENTS

| | | | |
|---|---|---|---|
| 3,192,405 | 6/1965 | Patchell | 323—68X |
| 3,296,516 | 1/1967 | Paine et al. | 320—35 |
| 3,201,681 | 8/1965 | Van Wilgen et al. | 323—20 |
| 3,443,193 | 5/1969 | Wright | 320—64 |

OTHER REFERENCES

Army Technical Manual TM 11-690, March 1959, pp. 85, 86 relied upon.

J D MILLER, Primary Examiner

J. M. GUNTHER, Assistant Examiner

U.S. Cl. X.R.

307—310; 320—35, 39